United States Patent [19]

Gessel et al.

[11] Patent Number: 4,459,797
[45] Date of Patent: Jul. 17, 1984

[54] HARVESTER REEL PICK-UP BAT CONSTRUCTION

[75] Inventors: James M. Gessel, La Moille; Gary L. Kunz; E. Louis Scheidenhelm, both of Mendota, all of Ill.

[73] Assignee: Hart-Carter Company, Mendota, Ill.

[21] Appl. No.: 431,052

[22] Filed: Sep. 30, 1982

[51] Int. Cl.³ .............................................. A01D 57/02
[52] U.S. Cl. ........................................ 56/220; 56/400
[58] Field of Search ................... 56/220, 219, 221–227, 56/400

[56] References Cited

U.S. PATENT DOCUMENTS 3,145,520 8/1964 Hume ..................................... 56/220
3,796,030 3/1974 Neal ...................................... 56/220

Primary Examiner—Jay N. Eskovitz
Attorney, Agent, or Firm—Chas. W. Rummler

[57] ABSTRACT

A spider arm journal and bat section connecting means for harvester reel pick-up bats which permits a limited amount of axial, angular and transverse flexure between the bat sections and the journal shaft to which the bat sections are mounted, the said means comprising a bat retainer assembly onto which the end of a bat is fastened and into which an end of the journal shaft is received with sliding fit engagement, and a connecting link integral with and normal to the journal connected adjacent its outer end with an attachment plate comprising the end of said assembly adjacent the journal.

5 Claims, 9 Drawing Figures

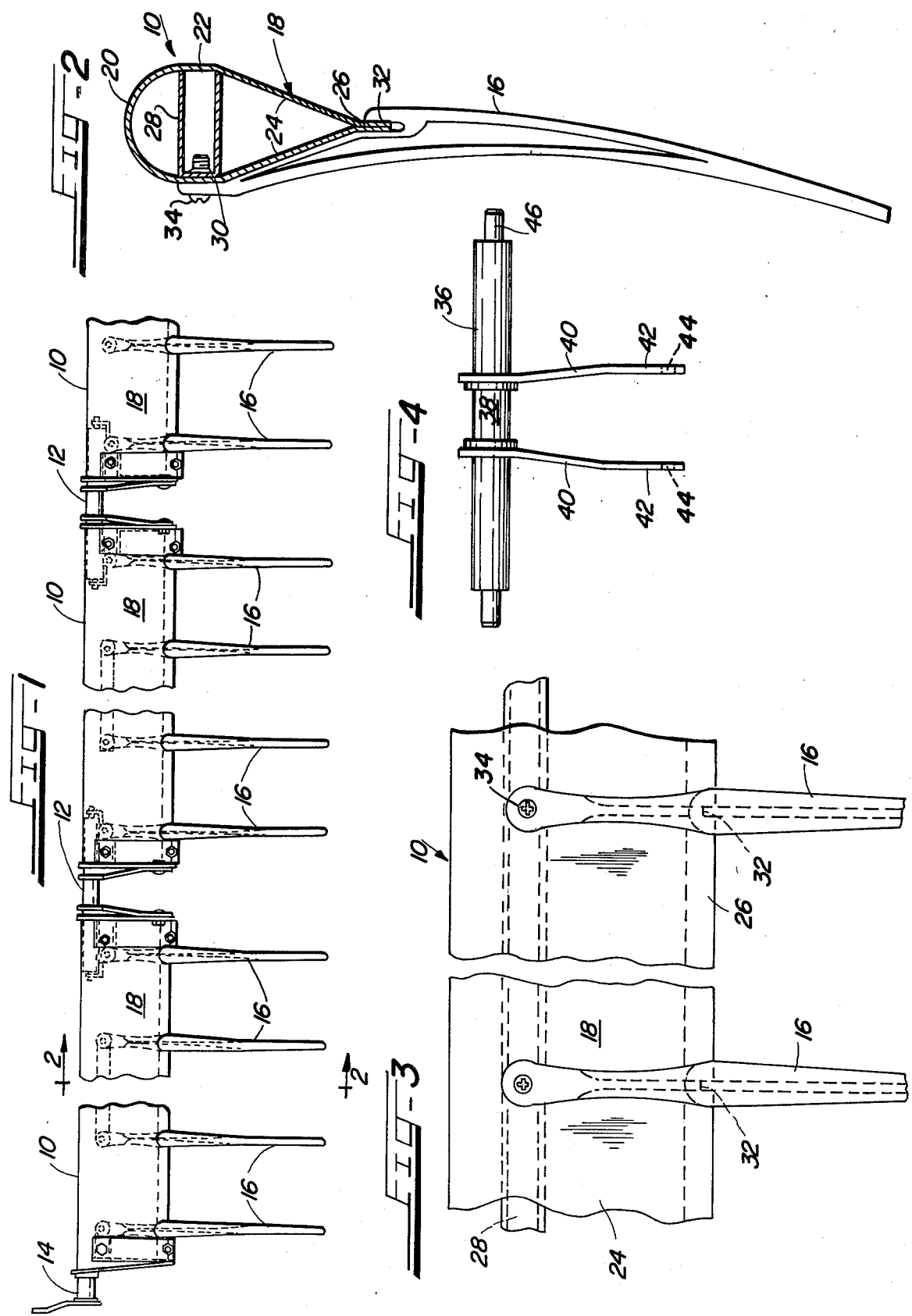

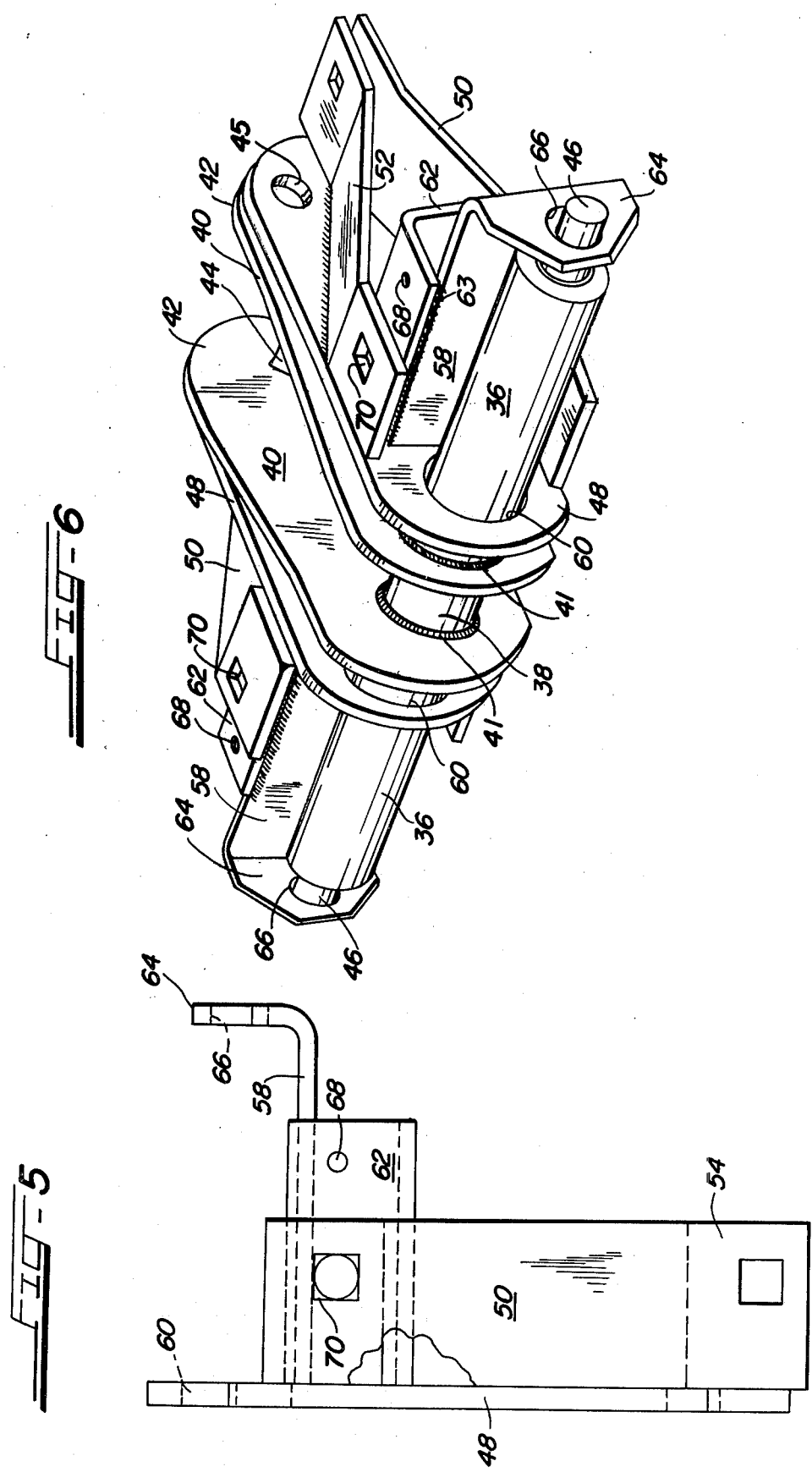

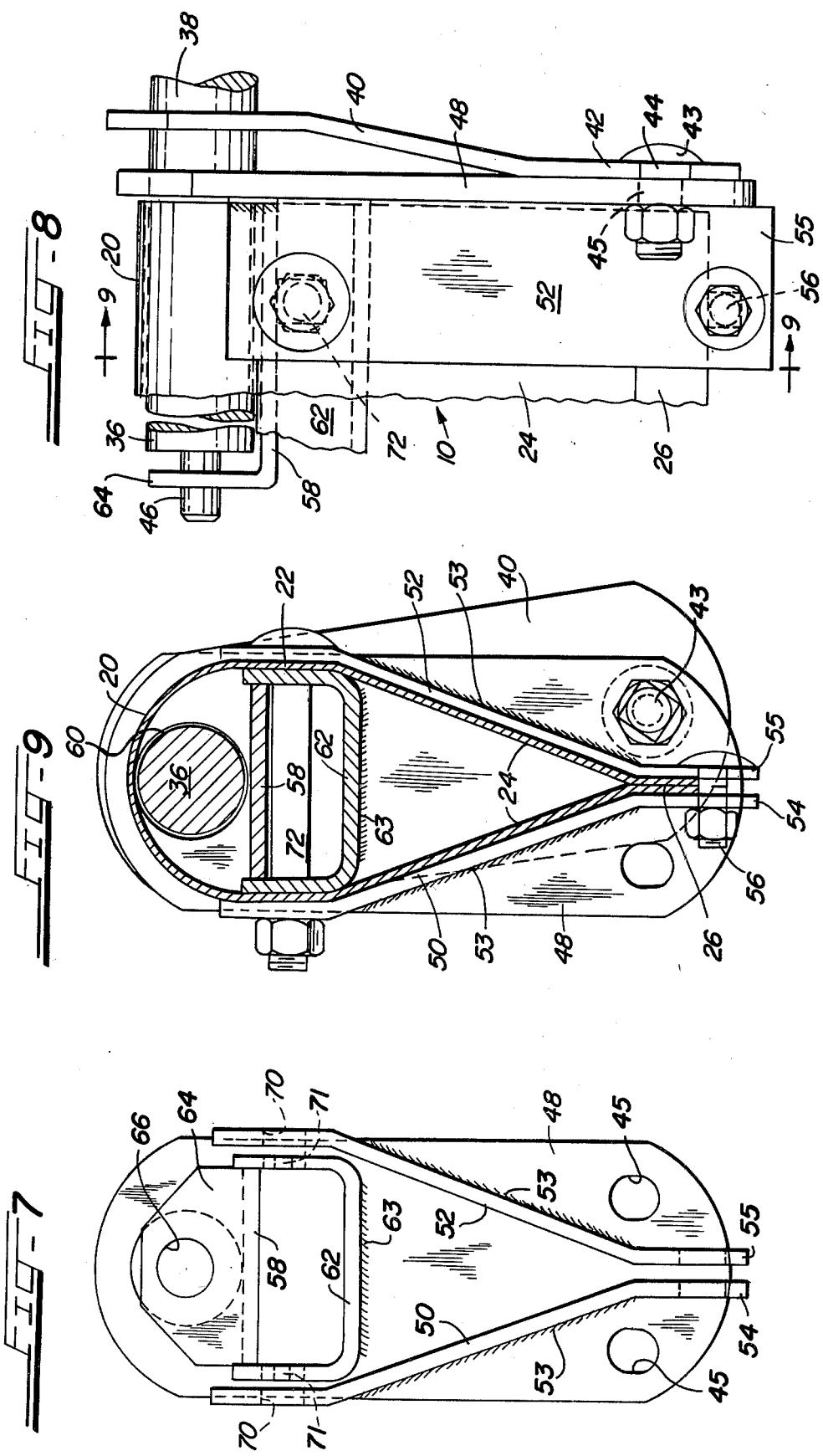

HARVESTER REEL PICK-UP BAT CONSTRUCTION

This invention concerns improvements in the construction of harvester pick-up reel bats and particularly such reels having a plurality of axially aligned bat sections journaled on the arms of intermediate bat support spiders.

BACKGROUND OF THE INVENTION

Harvester reels comprising crop pick-up bats having several aligned sections are well known in the art and particularly the use of sheet metal in place of wood for bat construction and the adoption of plastic tines for engaging the crop to be harvested. The development of the art in this respect is illustrated by Patents numbered U.S. Pat. Nos. 3,145,520, 3,497,729, 3,796,030 and 3,869,847.

While the use of lighter material has resulted in a considerable reduction of weight that must be handled by the harvester reel eccentric drive mechanism, it has been found that the torque unevenly applied to the several aligned bat sections by engagement of the pick-up tines with the crop, results in early fatigue failure of the bats and particularly at the interior spider pivot areas due to the rigidity of the bat connections and the relatively small deflections arising from poor assembly and lack of precise uniformity of the various parts comprising the reel construction.

It is an object of the present invention to provide a cure for this problem.

SUMMARY OF THE INVENTION

According to the present invention, an improved tubular sheet-metal bat blade, which tapers from the upper to the lower edge, is provided with a simple internal reinforcement against twisting or collapse, particularly at the points of tine attachment, and with an improved spider arm journal construction which allows a limited degree of flexure between each bat section and the journal shaft, both axially, angularly and normal to the pivot axis.

The reinforcement of the hollow tapered bat blade is afforded by a generally U-shaped channel disposed with its legs extending transversely of the blade from side to side, the bottom of the channel providing an extra thickness for a threaded means of attachment for a plastic crop engaging tine. The flexure at the connection of each of the bat sections with the other is afforded by a flexure link, integral with and normal to the journal, which is connected at its outer end with the lower end of a bat attachment bracket.

The bat attachment bracket integrally supports a pair of bat clamping straps, and a pivot shaft pilot member, these parts comprising a bat retainer assembly into which the end of the bat is inserted and fastened, the operating connection of the journal shaft and the hollow bat being through the attachment bracket and the clamping straps. The journal shaft passes freely through the attachment bracket and the pilot member of the retainer assembly with allowance for limited movement in the transverse directions. This together with the flex strap connection with the attachment bracket allows for misalignment of the bat sections without damage to the reel.

DESCRIPTION OF THE DRAWINGS

A specific embodiment of this invention is shown in the accompanying drawings in which:

FIG. 1 is a fragmentary elevational view of our improved harvester reel bat showing in a general way the assembly of several axially aligned bat sections;

FIG. 2 is a sectional view as on line 2—2 of FIG. 1 illustrating the internal bat reinforcement means and the manner of attachment of a plastic crop engaging tine to the bat blade;

FIG. 3 is a fragmentary view of the bat blade as seen from the left hand side of FIG. 2;

FIG. 4 is an elevational view showing a pilot ended journal shaft and flex strap assembly;

FIG. 5 is a side elevational view showing the integral bat retainer assembly which comprises the bat attachment bracket, bat clamping straps and the pivot shaft pilot bracket;

FIG. 6 is a perspective view illustrating the operating relationship of the elements comprising the journal shaft and flex straps, and the integral attachment bracket, clamping strap and pilot bracket assembly;

FIG. 7 is an elevational inner end view of the bat retainer assembly shown in FIG. 5;

FIG. 8 is a fragmentary elevational view showing the bat retainer as mounted on a flex strap of the journal shaft and showing an end of a bat fastened in the retainer; and FIG. 9 is a sectional view of the same as taken on line 9—9 of FIG. 8.

In the form shown in FIG. 1 our improved harvester reel bat comprises a plurality of bat sections 10 connected end to end by a plurality of journal sections 12 and a pair of crank end sections 14, only one of which is shown, and a plurality of crop pick-up tines 16 mounted in spaced relation along the blade portion 18 of each bat section. As shown in FIG. 2, each bat section is of a hollow form with a rounded, or semi-circular top 20 and relatively short, flat side portions 22, which are about equal to the radius of the top portion in length, and which then converge downwardly to form the sides 24 of the tapered blade 18 which terminates in a bottom edge 26 where the sides of the blade are formed to meet in face to face relation. Also, as shown in FIG. 2 the hollow bat section 10 is interiorly reinforced against collapse by a U-shaped member 28 disposed with its legs extending transversely of the bat between the flat side portions 22 thereof, the U-shaped member having a flat base 30 about equal in width with the flat side portion 22 against which it bears. This U-shaped member extends substantially the entire length of the bat terminating short of the crank end sections 14 and the journal sections 12 so as not to interfere with those portions of the bat structure. The tine 16 is designed to engage in a notch 32 in the bottom edge 26 of the blade portion 18 and is secured at its upper end by a threaded means 34 engaged with the flat base 30 of the U-shaped member 28.

As shown in FIGS. 4 and 6, each of the journal sections 12 comprises a pivot shaft 36 having a journal portion 38 midway between its ends bounded by the flat ends of a pair of parallel flexure links or flex straps 40 which are welded to the shaft as at 41 on the sides opposite the journal 38. As seen in FIG. 4 each of these flat flexure links 40 is bent between its ends so as to spread the free ends 42 apart about twice the length of the journal and axially of the shaft, the free ends 42 being about one-third the length of the link and made to extend at right angles relative to the shaft axis. Also, a bolt hole 44 is provided adjacent the free end of each link and these holes are made to be concentric with each other for a purpose to be explained. As shown in FIGS. 4 and 6 each end of the journal shaft 36 is provided with a pilot 46 which consists of an end extension having about half the shaft diameter and being about the shaft diameter in length. The function of the pilot 46 is to facilitate making connection with the bat retainer assembly.

The bat retainer assembly is illustrated by FIGS. 5, 7, 8 and 9 and as shown is a unitary structure comprising a flat attachment plate or bracket 48, of about the shape and size of the flexure links 40, onto which a pair of bat clamping straps 50 and 52 are integrally mounted by welding, as at 53. Each clamping strap is shaped to fit against the portions 22–24 of a respective side of the bat blade and the clamping straps 50 and 52 are spaced apart on the bracket 48 so as to receive a bat end between them with a sliding fit as shown in FIG. 9, with the bottom ends 54–55 positioned to clamp the bottom edge 26 of the bat blade between them by means of a bolt 56 which passes below the blade edge 26 and pulls the ends 54–55 toward each other.

The pivot shaft pilot means which is also a part of the retainer assembly comprises a flat plate 58 which extends interiorly below the shaft opening 60 of the attachment bracket 48 and is integrally mounted on and between the upwardly projecting legs of a support channel 62 which, in turn, is integrally mounted on the attachment bracket 48. The channel 62 extends inwardly from the attachment bracket, to which it is fastened by welding 63, and is of a width such as to be spaced inwardly of the clamping straps 50–52 sufficiently to be received into the end of the bat as shown in FIG. 9. The pilot plate 58, which is welded to the support bracket 62, extends beyond the end of the journal shaft 36 and has an upwardly turned portion 64, of at least the height of the shaft 36, having an opening 66 concentric with the journal shaft axis and into which the shaft pilot 46 projects when assembled with the retainer assembly and the bat.

The pilot opening 66 in the end 64 of the pilot plate 58 is somewhat larger in diameter than the journal shaft pilot 46; for example, about 20 to 25% greater than the diameter of the pilot 46 and it is the difference in size of these two elements that governs the flexure, or "live" action between the journal shaft and the harvester reel bat to which the shaft is connected. It will now be seen that flexure of the bat-journal shaft joint about a horizontal axis results in movement of the piloted shaft within the holes of the attachment bracket and the hole 66 in the pilot plate end and this flexure of the bat is accomplished not only by the flexure strap 40 but also by the sizing of the pilot hole in relation to the pilot itself so that a controlled amount of movement between the journal shaft and the bat is allowed in this area.

It will now be seen that the sole physical connection of the journal shaft and the bat retainer assembly is through a single bolt 43 which connects the flexure strap 40 with the attachment bracket 48. In order to avoid the need for right hand and left hand retainer assemblies for connecting harvester bats in end to end relation at the spider journal, the attachment plate or bracket 48 is provided with two horizontally spaced openings 45 to accommodate a respective flexure strap 40 so as to keep the end to end connected bats in parallel relationship. The two holes in the attachment plate are in precisely equal relation with the center line of the attachment plate and since the flexure brackets mounted on the journal shaft are parallel with each other the reversal of the retainer mechanism is readily accommodated.

As shown in FIGS. 5 to 9, inclusive, the upper end of each clamping strap 50–52 is provided with a bolt opening 70 aligned with a concentric opening 71 in each leg of the support channel 62 and in the flat part 22 adjacent each end of the hollow bat section 10, for passage of a bolt 72 securing the retainer assembly on the end of the respective bat section. This bolt 72 is the only mechanical connection of the journal shaft with the harvester reel bat itself, since the retainer assembly is only a "slip fit" into the end of the bat, and because of the flex strap 40 there is allowance for flexure and misalignment of the shaft relative to the bat without damage to the reel.

Also as shown in FIG. 6, the pilot plate support channel 62 is provided with an opening 68 for reception of a tine mounting screw for attaching the tine nearest the journal section 12 of the bat assembly. This allows approximately equal spacing of the tines from end to end of the end-to-end connected series of bats comprising the full harvester reel.

In the use of the improved harvester reel bat connection of the spider journal shaft with the end of a bat, the retainer assembly is first applied onto the end of the bat as shown in FIGS. 8 and 9, the retainer then being secured to the bat by the bolt 72. Then the journal shaft 36 is entered into the retainer assembly through the opening 60 in the attachment plate 48 being more or less guided by the pilot plate 58 until the pilot 46 has entered into the opening 66 at the end of the pilot plate, as seen in FIGS. 6 and 8. The parts of the structure are proportioned so that at this point the flat end 42 of the flex strap 40 comes into engagement with the outer surface of the attachment plate 48. Then the journal shaft is rotated until the flex strap end opening 44 becomes aligned with an opening 45 in the attachment plate for insertion of a mounting bolt 43. The securement of the bolt 43 affords the final and positive connection of the journal shaft 36 and the harvester bat 10.

Although but one specific embodiment of this invention has been herein shown and described, it will be understood that details of the construction shown may be altered or omitted without departing from the spirit of the invention as defined by the following claims.

We claim:

1. A harvester reel bat and spider mounting assembly comprising a pivot shaft having a journal portion intermediate its ends and a flexure strap fastened to the shaft at each end of the journal portion, said flexure straps projecting substantially radially from the pivot shaft and having end portions normal to the shaft axis, an attachment bracket substantially aligned with an adjacent flexure strap and having an opening at one end for endwise reception of the pivot shaft, a pair of clamping straps integrally mounted on the attachment bracket normal to the surface thereof and being formed to fit the end side walls of a harvester reel bat inserted between them, means to secure said clamping straps to the bat when it is inserted between them, and means for securing the free end of a flexure strap to an adjacent end of the said attachment bracket.

2. The harvester reel bat assembly defined by claim 1 wherein each flexure strap is bent intermediate its ends to position the normal end portion thereof outwardly of the journal in the axial direction of the shaft.

3. The harvester reel bat assembly defined by claim 1 wherein the attachment bracket is a flat plate having a bolt hole adjacent its other end and the flexure strap has a complementary bolt hole adjacent the end of its end portion that is normal to the said pivot shaft.

4. A harvester reel bat mounting assembly as defined by claim 1 wherein a shaft pilot bracket is mounted on the same side of the attachment bracket as the clamping straps and extending between them in the axial direction of the pivot shaft, a pilot extension on the end of said pivot shaft, and means on said pilot bracket for axially engaging said pilot extension where the pivot shaft is inserted in the shaft opening of the attachment bracket.

5. A harvester reel bat mounting means comprising a retainer assembly adapted for slip fit mounting onto an end of a hollow bat and comprising a flat faced attachment bracket having a pair of clamping straps mounted thereon normal to a flat face thereof, said clamping straps each being spaced apart and shaped to fit the adjacent surface of a bat inserted between them, a mounting shaft pilot bracket mounted on said attachment bracket between said clamping straps to extend into the bat, and means on said pilot bracket to receive the piloted end of a pivot shaft, said attachment bracket having an opening aligned with said pilot bracket for reception of the end of a pivot shaft having a piloted end.

* * * * *